Nov. 29, 1966  R. F. PEZZILLO  3,288,073
CANNED PUMP HAVING REDUCED HYDRAULIC THRUST
Filed Dec. 1, 1964

United States Patent Office 3,288,073
Patented Nov. 29, 1966

3,288,073
CANNED PUMP HAVING REDUCED HYDRAULIC THRUST
Rinaldo F. Pezzillo, Levittown, Pa., assignor to Pall Corporation, Glen Cove, N.Y., a corporation of New York
Filed Dec. 1, 1964, Ser. No. 414,981
7 Claims. (Cl. 103—87)

This invention relates to a centrifugal pump having means for decreasing the forward hydraulic thrust on the impeller shaft resulting from the imbalance in pressure across the impeller. More particularly, it relates to a centrifugal pump wherein the net forward thrust is decreased or offset by an opposing thrust applied to the impeller shaft by exposing a pressure surface attached to the shaft to the outlet pressure while drawing pumped fluid from behind the rotor through the impeller shaft, and thus reducing pressure behind the rotor, to obtain a lessened forward thrust.

This invention is designed for use with a canned centrifugal pump. The canned, or close-coupled, pump is characterized by having the motor housing and the pump housing combined within a single enclosure. This type of pump is especially useful when it is undesirable to have any leakage, such as when pumping extremely corrosive or noxious fluids, or to prevent the leakage of air into the system which might lower the vacuum level or overpower the vacuum producing system in a distillation system.

The problem of forward hydraulic thrust in a centrifugal pump of the canned motor type has long caused many problems to the industry. The most common means, and the most obvious, for preventing forward movement of the shaft due to the thrust is the thrust bearing. This bearing comprises (1) a thrust washer, rigidly attached onto the impeller shaft, and (2) in rotating contact with the thrust washer, the rear bearing face of the front bearing supporting the impeller drive shaft. These parts are prone to wear out, due to the constant rubbing of the washer face against the bearing material under the relatively large thrust force by the washer against the bearing. The resulting excessively high friction losses decrease the efficiency of the pump. Another problem is caused by the need to insure that the thrust washer and bearing face are perfectly flat and perpendicular to the longitudinal axis of rotation of the shaft. Even the slightest angle from the perpendicular will result in a moment on the shaft perpendicular to the longitudinal axis. This, obviously, will quickly result in an uneven wear on the shaft bearing and misalignment of the rotor and impeller, which will further decrease the efficiency of the pump. Furthermore, at the high rotational speeds usually associated with centrifugal impellers, a slight wobble caused by the misalignment will eventually cause a cracking in the impeller, and, in the case of the rotor, will eventually cause a breakdown of the motor, as the rotor begins to rub against the stator face or the separating wall. The gap between the rotor and the stator is normally very small.

Other methods have been tried in the past to neutralize this forward thrust. There have been attempts to utilize a so-called "floating" impeller shaft wherein the shaft has a certain amount of free end-play along its longitudinal axis and is allowed to shift back and forth as the net thrust and counterthrust varies. This type of device depends upon a balancing of the forward thrust forces inherent in the operation of the impeller with the force applied in an opposite direction resulting from the pressure drop across the rotor. This results in the shaft being in constant reciprocation to reach a balance. One embodiment of such a device is disclosed in U.S. Patent No. 3,031,973 to Kramer. In this device, Kramer employs a motor compartment divided into two sections by the rotor. The rotor is so designed that fluid flow between the two sections can only be through the narrow annular gap separating the rotor and stator.

These two sections are in fluid flow connection with the low pressure side of the impeller. The first or forward section of the compartment is also in connection with the high pressure side of the impeller. The low pressure connections are made through variable channels formed between a pair of flanges in each section, one flange in each pair being attached to the shaft, and the other to the bearing. These flanges act as thrust bearings and serve to limit the end-play. The channels between the flanges connect to the bearings, and then the low pressure side of the impeller. This also allows the fluid to lubricate and cool the bearings.

The high pressure from the outlet side of the impeller acts against the front end of the rotor to force the shaft backward until the flange strikes against the rear bearing. This closes the rear bearing, preventing any further fluid from passing out from the rear compartment, while the open front compartment channel decreases the pressure in the front compartment. The forward thrust thus developed then forces the shaft forward until the flange strikes the front bearing, the rear channel is opened, the front channel is closed, and the backward thrust resulting from the pressure drop across the rotor builds up again until it exceeds the forward thrust, and again forces the shaft backwards until the flange strikes against the rear bearing, repeating the process.

As a result of this continual reciprocation of the shaft, there are continual impacts between the faces of each pair of flanges which will eventually cause damage to the pump. As these high speed centrifugal impellers are rather delicately balanced, the continual jarring impact between the flanges will eventually bring it out of alignment. Although under ideal conditions the pump should reach equilibrium where the shaft will be balanced at some point, most practical pumps have some slight variation in the speed of operation which will prevent any continuing equilibrium state being achieved.

Similarly, in the case of the Kramer device, if some change in operation forces the pump to operate in a position where one of the pairs of flanges is in continuous contact, the bearing will not be properly lubricated, as the flow of lubricant will be cut off when the channels are closed, and the bearing will eventually run dry and bind. In the Kramer device, fluid can flow between the bearing surfaces from the rotor compartment only when the flanges are separated. When they are touching, this flow is impossible. For other centrifugal devices utilizing the pressure from the impeller to act against the forward thrust, see U.S. Patents Nos. 2,809,590, 2,715,-367 and 1,146,079.

In accordance with the invention, a centrifugal canned pump is provided characterized by an impeller shaft having decreased net forward thrust but which nonetheless is fixed along the longitudinal axis in the conventional manner. Due to the lessened net forward thrust, wear is reduced between the moving and stationary bearing parts, while the wear and tear of a reciprocating shaft is eliminated. Thus, the pump of the invention retains most of the advantages of the "floating" shaft type of pump, while avoiding the disadvantages.

The pump of the invention comprises, in combination, a housing having fluid inlet and fluid outlet passages, an impeller rotatably disposed across the line of fluid flow therebetween, an axial opening in the impeller for entry of fluid, and a circumferential opening for delivery of pumped fluid under centrifugal pressure therefrom, a motor rotor and a motor stator in the housing, an impeller shaft having the impeller attached at a front end and the rotor at a position behind the impeller, bearing means in the housing rotatably supporting the shaft, thrust opposing means attached to the shaft having a surface fixed into rotatable engagement with a bearing means, an axial passage in the shaft open at each end, a fluid chamber behind the rotor, the rear end of the axial passage opening into said chamber, the other end of the passage opening into the inlet side of the impeller, a pressure surface exposed to pressure on the outlet side of the impeller and attached to the shaft, tending to urge the shaft rearwardly, and a pressure surface attached to the shaft and exposed to pressure in the fluid chamber behind the rotor, tending to urge the shaft forwardly, the pressure surfaces and the axial passage being dimensioned to produce a net forward thrust of reduced magnitude against the front bearing.

In a preferred embodiment, the rotor is mounted on the shaft with a narrow gap between it and the surrounding stator, and enclosed within a can, the opposite ends of which serve as the pressure surfaces. The gap also serves as a fluid connection between the rear fluid chamber and the outlet side of the impeller. Further, the opening into the axial passage of the shaft from the inside of the impeller is in the form of a plurality of orifices in the side of the shaft.

In the pump of the invention it is possible to use conventional thrust washers as the thrust opposing means without the problems which have persistently plagued users of centrifugal canned pumps. Due to the decreased net forward thrust of the impeller, the thrust washers have a useful life of the same order as the onstream time of the other components of the pump; similarly, the tendency to misalign due to the large forces between the thrust washer and the bearing surface is also avoided. Further, by keeping the thrust bearing surfaces in continuous contact, this invention avoids the problems inherent in the continuously reciprocating shaft of the "floating" type as described above.

The impeller shaft in the centrifugal pump of this invention utilizes thrust-opposing means, such as thrust washers, which continuously rest against the thrust bearing surface, substantially without any end-play, in combination with means to exert a counteracting reverse thrust to the inherent forward thrust of the primary impeller. This reverse thrust is obtained due to a difference in the pressure tending to force the shaft forward due to fluid flow through the axial passage along the length of the impeller shaft. During operation of the pump, fluid thus is drawn into the central passage from the rear of the shaft, and expelled at the other end of the passage into the interior of the impeller, so as to exhaust into the eye of the impeller; the reduction in pressure behind the shaft thus obtained produces a reverse thrust which acts in opposition to the forward thrust of the impeller, and thereby reduces the pressure between the thrust washer and the opposing bearing face.

In addition, there may be provided an opening in the forward end of the shaft for providing lubrication to the forward bearing or for providing an auxiliary exhaust, or inlet, in the event of unusually high or low flow from rear opening.

There may also be provided a disk or sling washer attached to the shaft inside of the impeller and adjacent to the opening there, which increases the effectiveness of the opening in exhausting from the central passage by providing an "arm" for the secondary impeller thus formed.

As shown below, the thrust bearings of this pump have radial lubrication channels formed in the bearing surface, which assure a continuous supply of the pumped fluid for lubricating the bearing surface, with no possibility of starvation. The rate of discharge of fluid through the exhaust openings of the axial passage into the eye of the impeller increases as the speed of the impeller increases, in the same manner as the rate of discharge from the main impeller increases with speed, since they act as a secondary impeller. Therefore, the backward thrust caused by exhaust from the exhaust orifice increases as the forward thrust of the impeller increases, maintaining a low thrust between the thrust washer and bearing face at any rate of operation.

The improved features of this invention will be readily apparent from the detailed description given below taken in conjunction with the drawings.

Figure 1:
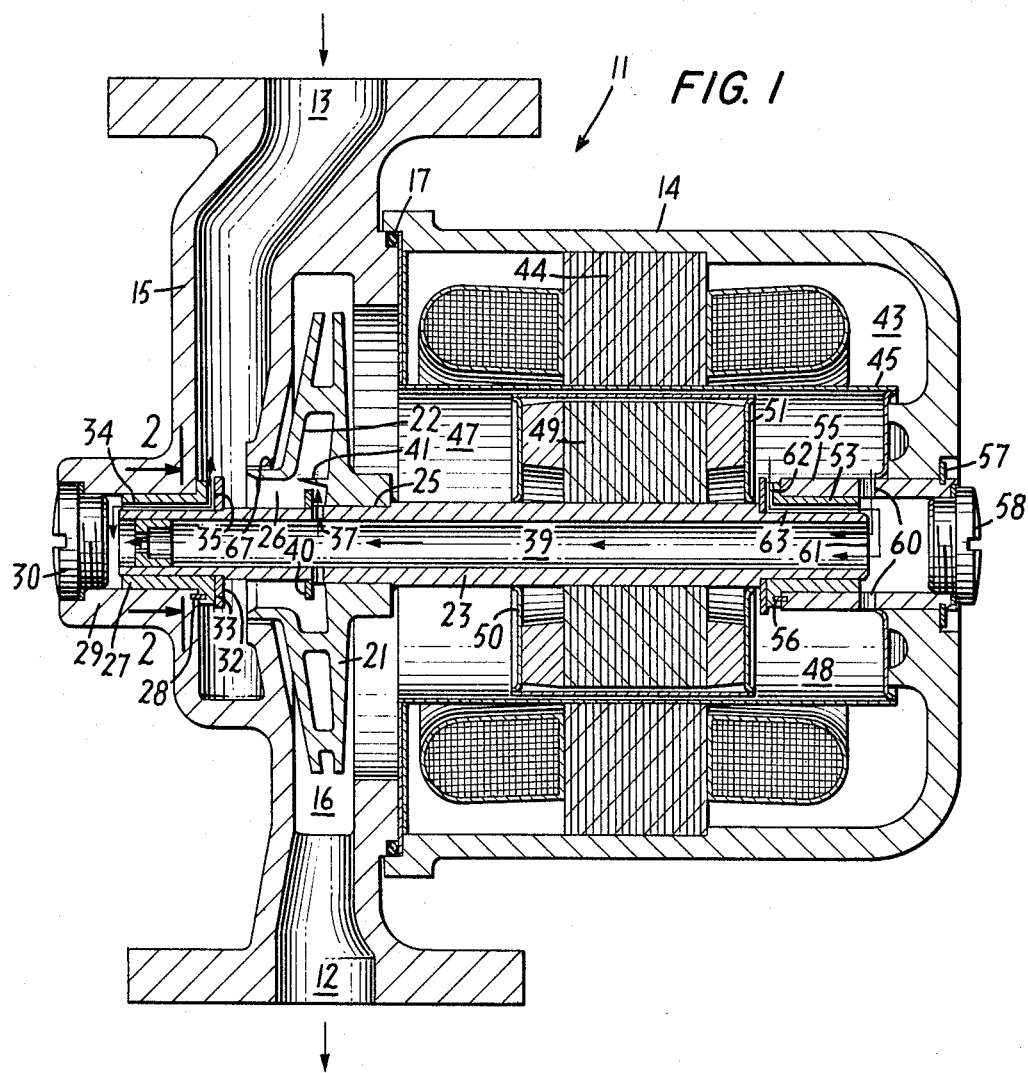
FIGURE 1 is a longitudinal section of a canned centrifugal pump including the reverse thrust features of this invention.
Figure 2:
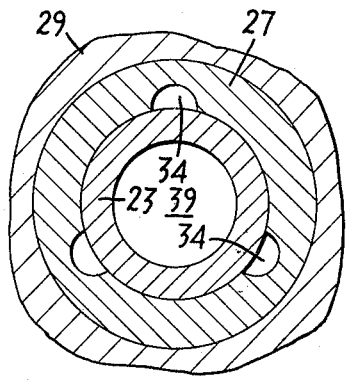
FIGURE 2 is a cross-sectional view taken along the lines 2—2 in FIGURE 1, showing the axial lubricating slots of the bearing.

The pump of FIGURES 1 and 2 comprises a housing generally indicated by 11 which is formed in two sections, the motor section 14 and the pump section 15. The sections are slip-fitted together and sealed with O ring 17. The pump section 15 has an outlet passage 12 and an inlet passage 13 connected through an internal volute 16, in which is placed an impeller 21, mounted on the front end of a shaft 23.

A necked-down portion 25 of the shaft 23 extends through an opening at the back end of the impeller 21, and extends through the central eye 26 of the impeller 21. The impeller 21 is welded onto shaft 23.

Bearing 27 is friction-fitted into a bearing retainer 29 formed in the front part of the pump section housing 15 and held in place by retainer pin 28. End screw 30 is threaded into retainer 29 to close it off and allow easy access for maintenance. The front end of the shaft 23 is supported by bearing 27. The thrust washer 32 is rigidly attached to the shaft 23 in front of the impeller 21 and is in face to face contact with the thrust bearing 33. Axial channels 34 are provided in the bearing 27 in the form of semicircular slots as shown in the cross-section of FIGURE 2. Similarly, there are radial channels 35 formed in the bearing face 33 which allow fluid to pass from the motor compartment between the thrust washer 32 and bearing face 33 into the axial channels 34. These axial channels serve to provide lubricating fluid to the bearing surface as the shaft rotates.

Orifices 37 are provided through the shaft 23 connecting the axial passage 39 of the shaft 23 with the eye 26 of the impeller, allowing fluid to pass therebetween. There are preferably at least two orifices, and they are evenly spaced around a circumference of the shaft. Sling washer 40 is inserted onto the shaft at a position adjacent to the orifices 37, to increase the effective flow rate of the fluid passing therethrough from the axial passage 39 into the eye 26 of the impeller. The washer may be welded onto the shaft. In the preferred embodiment shown, where the orifice is immediately adjacent to the rear inner surface 22 of the impeller 21, the rear surface 22 and the washer 40 act as the arms of the impeller. If the orifices 37 were, however, forward of this position, it would be helpful to have two washers, one on each side of the orifices.

By setting the diameter of the washer 40 so that the distance between the outside circumference and the inner wall 22 of the impeller at shoulder 41 is small enough, a venturi throat may be formed at that point. This causes an additional back pressure against the shaft, increasing the effectiveness of the back thrust.

The stator chamber 43 is an annular chamber just inside of the motor housing 14 containing the stator 44. Interior cylindrical wall 45 separates the stator chamber 43 from the rotor chamber 47 and 48. The rotor 49 which is rigidly attached to the shaft 23, is enclosed at both ends by end covers 50 and 51 which are welded onto the shaft 23.

The bearing retainer 55 is slip-fitted into motor housing 14 and tightly held by retaining ring 57. Bearing 53 is friction-fitted into bearing retainer 55, and held in place by bearing retainer pin 56. End screw 58 is threaded into the bearing retainer 55 to complete the housing and to allow easy access for maintenance. Ports 60 permit the flow of fluid between the rear rotor compartment 48 and the rear opening 61 and thus the axial passage 39 in the shaft 23. The open area of these ports can be as large as desired, but is preferably at least sufficient to handle the maximum flow through the passage. The rear bearing has radial slots 62 and axial slots 63, similar to those found in the front bearing 27.

The stator armature 44 is connected to a source of alternating electrical power (not shown).

This type of canned pump operates in a bath of the pumped fluid i.e., the rotor compartments 47 and 48 are filled with the pumped fluid. The bearings 27 and 53 are thus lubricated and cooled by the pumped fluid and the rotor 49 and shaft 23 are also cooled by the same fluid. Similarly, the stator compartment 44 is also cooled by the fluid flowing through the rotor compartment. The pumped fluid enters the rotor chamber 47 through the channel formed between the front end of the impeller 21 and the shoulder 67 of the pump housing. The pumped fluid flows to the rear rotor section 48 through the annular channel formed between the rotor 49 and cylindrical wall 45, and then into the passage 39.

In operation, the pump is first filled with the fluid to be pumped so that the rotor compartment 47, 48, the central passage 39 and the pump housing 15 are all filled with fluid. The pump is then turned on and the fluid is drawn in through the inlet passage 13, enters the eye of the impeller, and then, after passing through the impeller 21, is discharged through the outlet passage 12. The fluid in the rotor compartment passes through ports 60 and slots 62 and 63 into the rear shaft opening 61 and then through the passage 39, whence it is exhausted through the orifices 34 into the eye 26 on the low pressure or inlet side of the impeller. Depending upon the relative volumes of fluid exhausting through the ports 37 and entering through the rear opening 61, the front opening into the passage 39 may be either an exhaust or an intake port.

The exhaust orifices 34 are preferably in the position shown, that is, in the central impeller eye towards the rear of the impeller. However, it is also possible to place the exhaust orifices 37 forward of this position, either within the impeller eye, in a position closer to the entrance thereto, or just in front of the impeller, between the impeller 21 and the thrust washer 32.

In the situation where the ports are adjacent to the thrust washer 32, that member will act in the same manner as the sling washer to improve efficiency. However, as stated above, in that situation it would probably be preferable to have a second washer on the other side of the orifices 37, so as to form the arms of an impeller, as explained above.

It should be realized that the orifices 37 act as a secondary impeller within the primary impeller, to counteract the normally forward thrust of the primary impeller. It is thus seen that as the primary impeller increases in speed and output, and therefore the forward thrust increases, the shaft and exhaust orifices from the axial passage will also increase in speed and output, and therefore, the backward thrust will increase with the forward thrust.

In this device the size of orifices 37 may be adjusted by moving the washer 40 so as to partially cover the orifices. Their size will be determined by the desired backward thrust and upon the size of the pump as well as its anticipated speed ranges. Similarly, the inside diameter of the passage 39 will also be determined by these parameters.

Preferably, the maximum size pump for effective utilization of this invention is a pump having an impeller diameter of approximately five inches. In this situation, the inside diameter of the passage 39 is approximately ½ inch, the diameter of the orifices 37 is ⅛ inch, and the annular width of the sling washer 40 is approximately ¼ inch. The inner diameter of the impeller eye at the entrance is approximately 1½ inches.

When used as described above, this invention increases the effective onstream time of a centrifugal pump. It will also serve to increase the efficiency of the pump by lowering frictional losses. It should be pointed out that the fluid passing through the bearing and the axial passage 39 serves the additional function of lubricating and cooling the motor.

The various portions of the pump unit are shown as being slip-fitted or welded together. However, this is not critical to the invention and if desired, for ease of maintenance, the various sections may be bolted together or have a threaded fit. Similarly, the material of construction is not critical and will depend on the material being pumped and the temperatures of operation.

Although this backward thrust producing device is described with the preferred canned or close-coupled type of pump, it can be useful with any type of axial inlet centrifugal pump.

The scope of the invention is not limited to the specific examples given above but rather as defined in the claims below.

What is claimed:

1. A centrifugal pump comprising, in combination, a housing having fluid inlet and fluid outlet passages, an impeller rotatably disposed across the line of fluid flow therebetween, an axial opening in the impeller for entry of fluid, and a circumferential opening for delivery of pumped fluid under centrifugal pressure therefrom, a motor rotor and a motor stator in the housing, an impeller shaft having the impeller attached at a front end and the rotor at a position behind the impeller, bearing means in the housing rotatably supporting the shaft, thrust-opposing means attached to the shaft having a surface fixed into rotatable engagement with a bearing means, the juxtaposed bearing means and thrust-opposing means surfaces defining passages therebetween for entry of fluid for lubricating the bearing, an axial passage in the shaft open at each end, a fluid chamber behind the rotor, the rear end of the axial passage opening into said chamber, the other end of the passage opening into the inlet side of the impeller, a pressure surface exposed to pressure on the outlet side of the impeller and attached to the shaft, tending to urge the shaft rearwardly, and a pressure surface attached to the shaft and exposed to pressure in the fluid chamber behind the rotor, tending to urge the shaft forwardly, the pressure surfaces and the axial passage being dimensioned to produce a net forward thrust of reduced magnitude against the front bearing.

2. A centrifugal pump in accordance with claim 1, wherein the rotor is mounted on the shaft with a narrow gap between it and the surrounding stator, the gap serving as a fluid connection between the rear fluid chamber and the outlet fluid side of the impeller, the rotor being enclosed within a can, the opposed ends of which serve as the pressure surfaces.

3. A centrifugal pump in accordance with claim 1 having at least two orifices at the impeller end of the axial passage in the shaft, equally spaced around a circumference of the shaft and opening into the interior of the impeller axially of the eye.

4. The pump of claim 3 having a sling washer on the shaft spaced from the wall of the impeller adjacent to the orifices.

5. The pump of claim 3 having means to vary the diameter of the orifices.

6. A centrifugal pump in accordance with claim 1, wherein there are bearing means at each end of the impeller shaft.

7. A centrifugal pump in accordance with claim 1, wherein there is a fluid connection in the housing between the fluid chamber and the outlet fluid side of the impeller.

References Cited by the Examiner

UNITED STATES PATENTS

| | | | |
|---|---|---|---|
| 2,953,993 | 9/1960 | Strickland et al. | 103—112 X |
| 3,220,350 | 11/1965 | White | 103—87 |

ROBERT M. WALKER, *Primary Examiner.*